United States Patent [19]

Ito

[11] Patent Number: 4,799,396
[45] Date of Patent: Jan. 24, 1989

[54] REDUCTION GEAR

[75] Inventor: Takeshi Ito, Nagano, Japan

[73] Assignee: Machine Engineering Co., Ltd., Nagano, Japan

[21] Appl. No.: 29,516

[22] Filed: Mar. 25, 1987

[30] Foreign Application Priority Data

Mar. 25, 1986 [JP] Japan ................................ 61-64822
Sep. 19, 1986 [JP] Japan ............................... 61-222545

[51] Int. Cl.⁴ ........................ F16H 57/00; F16H 1/28
[52] U.S. Cl. ........................................ 74/410; 74/801
[58] Field of Search .................. 74/406, 409, 410, 801

[56] References Cited

U.S. PATENT DOCUMENTS 2,444,734  7/1948  Gillett .................................... 74/801
3,292,460  12/1966  Fritsch ............................. 74/410 X

FOREIGN PATENT DOCUMENTS 2608888  8/1977  Fed. Rep. of Germany ........ 74/409
0054844  3/1984  Japan .................................... 74/801
115880   2/1946  Sweden ................................ 74/801
0146844  3/1981  U.S.S.R. ............................... 74/410
1013656  4/1983  U.S.S.R. ............................... 74/801

OTHER PUBLICATIONS

Machine Design, Mar. 1949, p. 178.

Primary Examiner—Dirk Wright
Attorney, Agent, or Firm—Sughrue, Mion, Zinn, Macpeak & Seas

[57] ABSTRACT

A reduction gear in which an output shaft rotatably supports two planet gears engaging an internal gear fixed to a housing and a pinion gear at the end of the input shaft. The supports on the output shaft for the planet gears are circumferentially movable with respect to each other in order to eliminate back-lash.

9 Claims, 5 Drawing Sheets

REDUCTION GEAR

BACKGROUND OF THE INVENTION

1. Field of the Invention

The present invention relates to a reduction gear for reducing a high rotational spped of an electric motor, or the like, to a predetermined lower rotational speed. The invention particularly relates to the reduction in play due to back-lash in gears in such a reduction gear.

2. Background of the Invention

In the conventional reduction gears, input rotation is generally reduced by means of a gear train. In such a reduction gear, however, back-lash is inevitably caused in gearing of gears so that play is caused corresponding to the back-lash.

On the other hand, in a reduction gear of a harmonic drive system which has come into wide use recently, back-lash is almost eliminated. However, in the structure of a harmonic drive system, the difference in teeth number between a flexible spline structure and a circular spline structure is limited to only about 1 or 2 and therefore such a reduction gear can be used only in the case where there is a high reduction ratio of at least 1:50–1:60.

SUMMARY OF THE INVENTION

An object of the present invention is to eliminate back-lash in a reduction gear having a reduction ratio of about 1:3 to 1:50.

In order to achieve the above-mentioned object, according to the present invention, a planetary gear mechanism having a plurality of planet gears geared with a sun gear (a pinion) is supported on an input shaft as well as an internal gear disposed concentrically with the sun gear. There is provided means for displacing an inter-axes separation of the planet gears so that back-lash is eliminated by the adjustment of the inter-axes interval.

The input shaft and an output shaft are rotatably supported in a housing so as to constitute a reduction gear having a reduction ratio of about 1:3–1:15.

In a further embodiment, there are provided two stages of such planetary gear mechanisms. The displacing means displaces an inter-axes interval of the planet gears in each of the mechanisms so that back-lash is eliminated by the adjustment of the respective inter-axes intervals.

The second embodiment constitutes a reduction gear having a reduction ratio of about 1:20–1:50.

DETAILED DESCRIPTION OF THE PREFERRED EMBODIMENTS

Illustrated embodiments are arranged such that two planet gears are provided 180° symmetrically with each other with respect to a pinion and the inter-axes interval between of the planet gears adjustable by means of screws.

Figure 1:
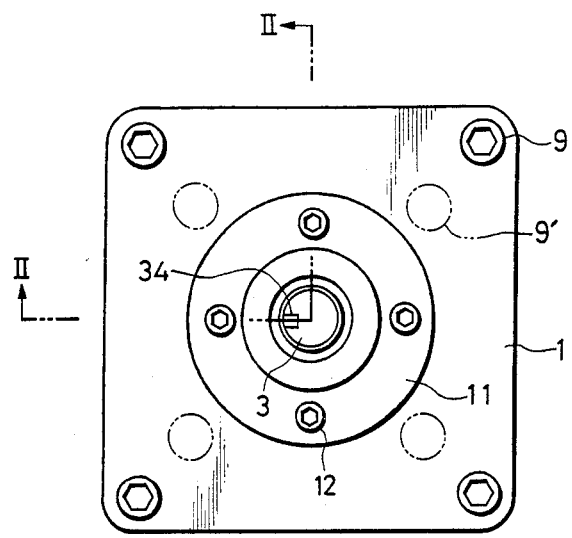
FIG. 1 is a plane view showing a first embodiment according to the present invention.
Figure 3:
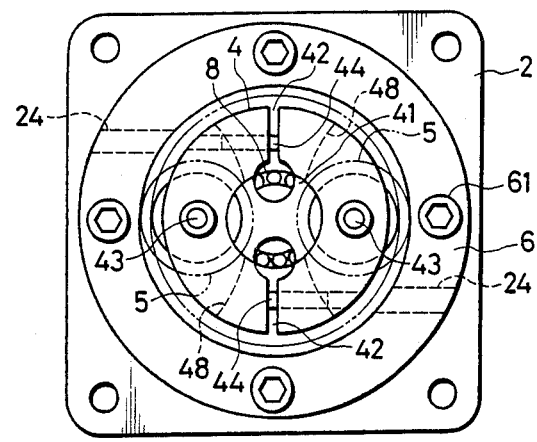
FIG. 3 is a plane view showing the embodiment in which the housing 1 is removed.
Figure 2:
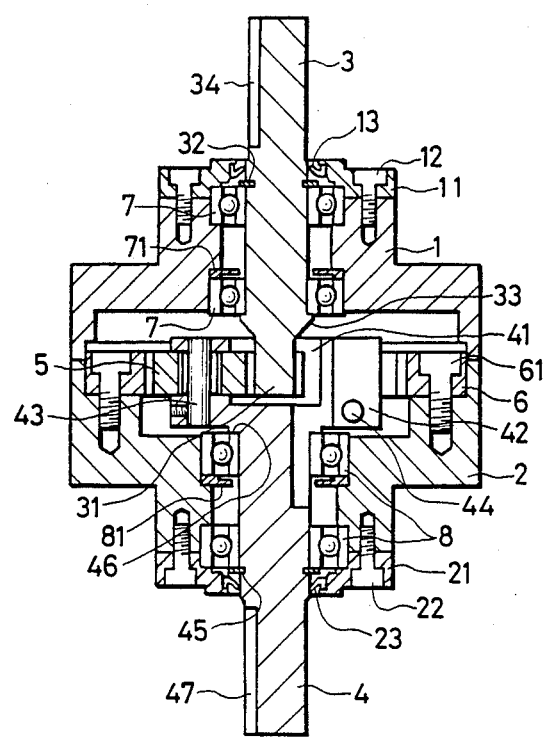
FIG. 2 is a section taken along II—II in FIG. 1.
Figure 4:
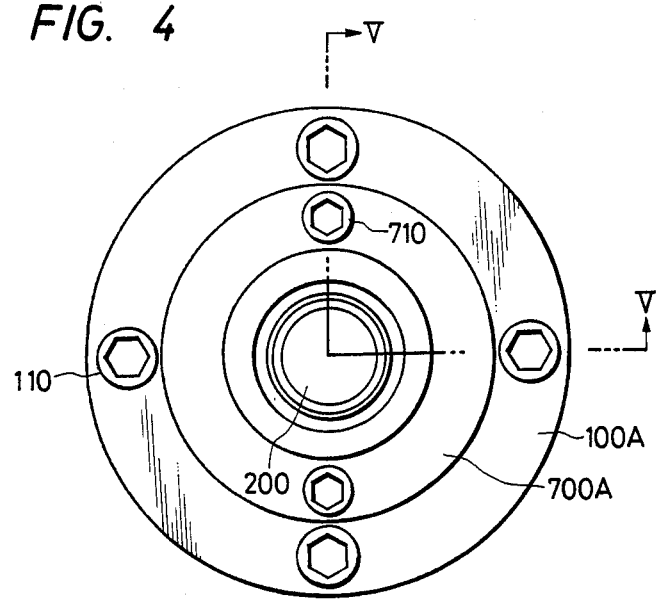
FIG. 4 is a plane view showing a second embodiment according to the present invention.
Figure 6:
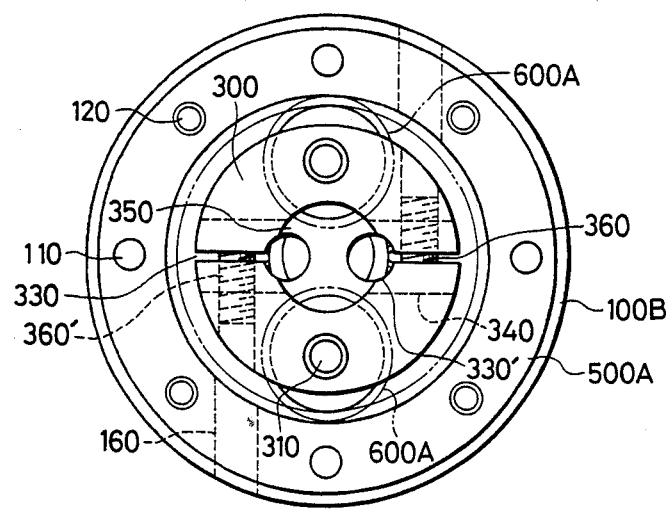
FIG. 6 is a plane view in which a housing 100A is removed.

Referrring to the drawings, the embodiments will be described hereunder. First Embodiment FIGS. 1 through 3 show a first embodiment which is suitable for a reduction ratio of about ⅓ through 1/15. In this embodiment, front and rear housings 1 and 2 are fixed by screws 9 with each other. Within a space chamber formed at a junction portion between the housings 1 and 2, an annular internal gear 6 is fixed by screws 61 to the rear housing 2 and a sun-and-planet gear mechanism which will be described later is accommodated within the chamber.

An input shaft 3 is rotatably supported through bearings 7 at the center of the front housing 1. The input shaft 3 is rotatably supported while being prevented from coming off by a step portion 33 of the input shaft 3 and a retaining ring 32 snapped in the input shaft 3, both of which bear axially against the bearings 7. An axial pre-load is exerted onto the bearings 7 by a spring 71 provided at a side portion of the bearings 7.

A pinion 31 is provided on the lower end of the input shaft 3 integrally with the input shaft 3 and concentrically with the internal gear 6.

An output shaft 4 is rotatably supported through bearings 8 at the center of the rear housing 2. The output shaft 4 is rotatably supported while being prevented from coming off by a step portion 46 on the output shaft 4 and clipped into the output shaft 4 and bearing against a retaining ring 45 the bearings 8. An axial pre-load is exerted onto the bearings 8 by means of a spring 81 provided at a side portion of the bearings 8.

A central recess portion 41 of the output shaft 4 is formed in the front end of the output shaft 4 and the pinion 31 is disposed in the recess portion 41. Two expanding slots 42 extending radially in the output shaft 4 are provided 180° symmetrically with respect to the center of the pinion 31 at the side portions of the central recess portion 41.

Further, two shafts 43 parallel to the input and output shafts 3 and 4 are fixed in the output shaft 4 at portions outside the central recess portion 41 at equal intervals with respect to the expanding slots 42 and 42 (180° symmetrically with respect to the center of the pinion 31). Two planet gears 5 are rotatably supported on the respective shafts 43 and are geared with the pinion 31 as well as the internal gear 6. Two arcuate grooves 48 are formed in the output shaft 4 so as to accommodate and to support the two planet gears 5 from both ends of the shafts 43.

Screw holes are formed to pass through the respective expanding slots 42 of the output shaft 4 from one side portions thereof and adjustment screws 44 are screwed respectively in the screw holes so as to be movable in the advancing/retreating direction.

Two transverse through holes 24 are formed in the rear housing 2 at its opposite side portions so that the two through holes 24 may be communicated with the respective screw holes.

Caps 11 and 21 fixed to the front and rear housings 1 and 2 by screws 12 and 22 respectively press the respective outer wheels of the outside bearings 7 and 8.

Axial key grooves 34 and 47 are formed respectively in the outer ends of the shafts 3 and 4 so as to connect the shafts to not-shown rotary shafts or the like. Rings 13 and 23 are provided for the purpose of sealing.

In this reduction gear, the reduction ratio can be properly set to 1:3 through 1:15 by properly selecting the tooth-number ratio of the gears.

The operation is as follows.

When the input shaft 3 is rotated, the pinion 31 is caused to rotate integrally with the input shaft 3 so that the planet gears 5 are rotated while revolving between the pinion 31 and the internal gear 6 to thereby rotate the output shaft 4 at a reduced speed.

Since the above-mentioned rotation is caused through the gearing of the gears, play due to back-lash is generated under a non-adjusted condition.

Therefore, the input shaft 3 or the output shaft 4 is rotated so as to make the through holes 24 of the rear housing 2 communicate with the respective screw holes of the output shaft 4 to thereby make it possible to insert a driver into the respective through holes 24. The respective adjustment screws 44 are advanced and retreated to change the respective widths of the expanding slots 42 and 42 so that the shafts 43 of the respective planet gears 5 are slightly displaced in the circumferential direction concentrically with the pinion 31 so as to make the gears 5 slightly approach one side or the other.

Owing to the approach described above, the backlash of the gears is eliminated so that the play in gearing is made to disappear at the approached side.

If the adjustment screws 44 are fastened, no looseness occurs in use.

The reason why the expanding slots 42 are made axially deep is that the shafts 43 can be circumferentially displaced with no variation in attitude thereof.

The respective expanding slot 42 is made circular at its innermost portion so that the expanding slot 42 can be prevented from splitting. However, in the case where no circular portion is formed, splitting hardly occurs because the amount of deformation due to the adjustment is slight.

Modifications

The embodiment described above is advantageous in balance because the pair of planet gears are provided bisymmetrically. However, the planet gears are not limited to two in number but may be selected to be in any number so long as they are plural. The positions of the gears are not limited to be symmetrical with each other but may be asymmetrical.

The adjustment may be carried out even in the case where only a single adjustment screw, only a single screw hole, etc., are provided. The planet gears may be supported by supporters provided separately from and fixedly attached to the output shaft. In the embodiment, the means for adjusting the inter-axes interval of the planet gears is arranged such that the respective adjustment screw is made to advance or retreat from one side of the corresponding expanding slot. However, alternatively, means for circumferentially displacing the shafts of the respective planet gears by inserting wedges or screws having tapered ends into the respective exapnding slots from the outside of the slots may be used as the inter-axes interval adjusting means.

Further, in the embodiment, the shape is rectangular in plane. However, if, as shown in FIG. 1, connection screws 9' are provided in such a manner as shown by imaginary lines (holes are provided in the internal gear so that the housings 1 and 2 are connected to each other by the connection screws passed through the holes), the housings may be made circular to reduce the volume thereof.

Furthermore, it is a matter of course that if the input and output shafts are interchanged with each other, in use the structure may be used as a speed up gear.

Second Embodiment

Referring to FIGS. 4 through 8, a second embodiment according to the present invention will be described hereunder.

In this embodiment, the speed reducing ratio is set to 1:25 by means of two reduction stages each having a speed reduction ratio of 1:5.

Figure 5:
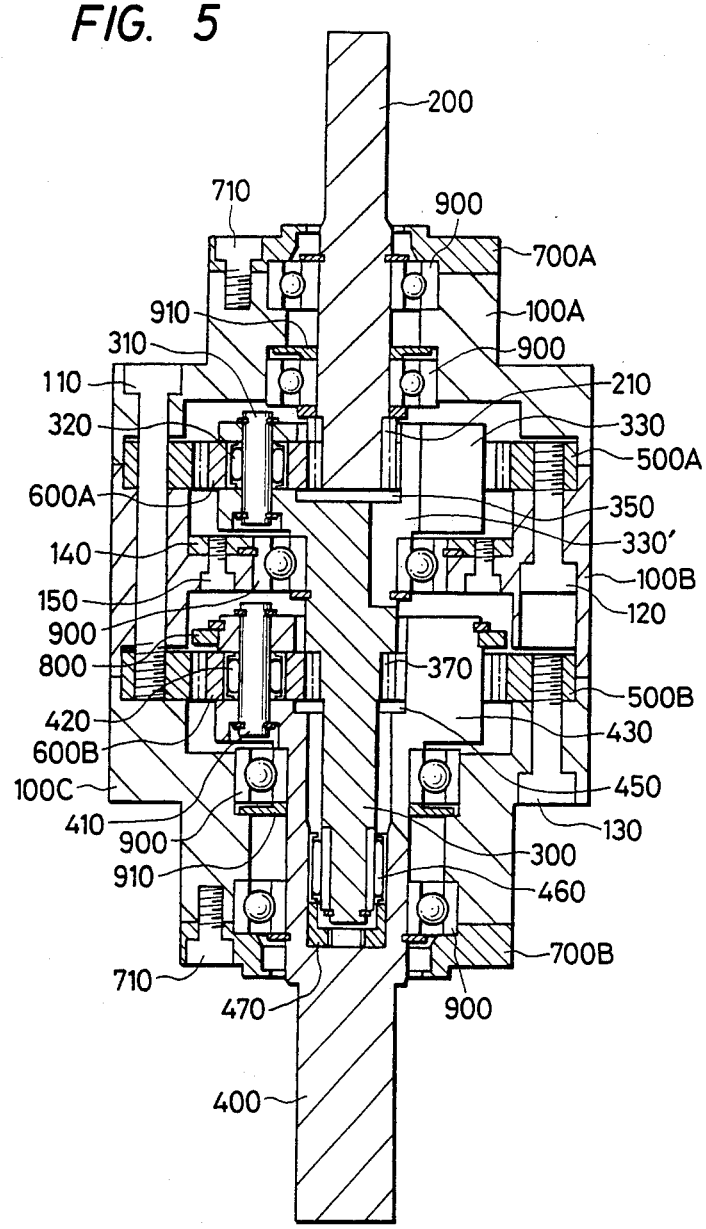
FIG. 5 is a section taken along V—V of the FIG. 4.

Although being disposed bisymmetrically, housings are illustrated in FIG. 5, for the sake of convenience for description of their structure, such that one half part including a retaining screw 110 is shown in the left-hand side and the other half part including retaining screws 120 and 130 at perpendicular location is shown in the right-hand side.

Front, intermediate and rear housing 100A, 100B, 100C and front and rear annular internal gears 500A, 500B are internally and fixedly assembled by means of retaining screws 110, 120, and 130 each being four in number. The internal gear 500A and 500B are disposed on inner circumference portions at junction portions between the housings.

An input shaft 200 is rotatably supported through bearings 900 at the center of the housing 100a. A pinion 210 is formed at a lower end of the input shaft 200 in the drawing and concentrically with the internal gear 500A.

Figure 7A:
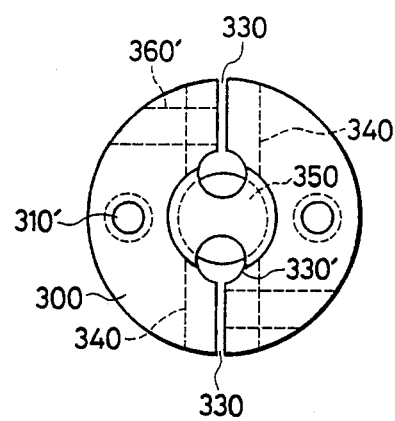
FIGS. 7A and 7B are axial and side views showing parts of an intermediate shaft.
Figure 7B:
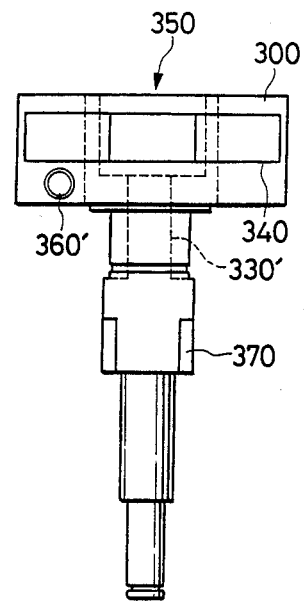

An intermediate shaft 300 is rotatably supported by a bearing 900 at the center of the housing 100B. As shown in FIG. 7A and 7B, the intermediate shaft 300 has a central hole 350 formed at an upper end of the intermediate shaft 300. Shaft holes 310' are formed on the opposite sides of the central hole 350. Expanding slots are each composed of a circular slot portion 330', formed radially inwardly, and an expanding slot portion 330, formed radially outwardly and extending from the circular portion 330'. The intermediate shaft 300 further includes notched portions 340, screw holes 360', and an intermediate pinion 370.

Planet gears 600A are supported within the notched portions 340 by shafts 310 through needle bearings 320. The shafts 310 are fitted at both ends in the shaft holes 310' of the intermediate shafts 300.

The pinion 210 is fittingly inserted in the central hole 350. Each of the planet gears 600A is geared with the corresponding internal gear 500A as well as the pinion 210.

Adjustment screws 360 are screwed in the respective screw holes 360' so as to be movable in the advancing and retreating directions.

Through holes 160 are formed in the housing 100B in the opposite side portions thereof so that they can be made to communicate with the respective screw holes 360'.

An output shaft 400 is rotatably supported through bearings 900 at the center of the rear housing 100C. The intermediate shaft 300 is rotatably supported at its lower end through a needle bearing 460 disposed on a bearing support 470 at the bottom portion of a central hole 450 in the output shaft 400.

Figure 8A:
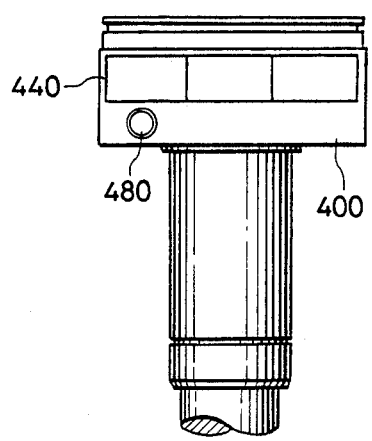
FIG. 8A and 8B are side and axial views showing parts of an output shaft.
Figure 8B:
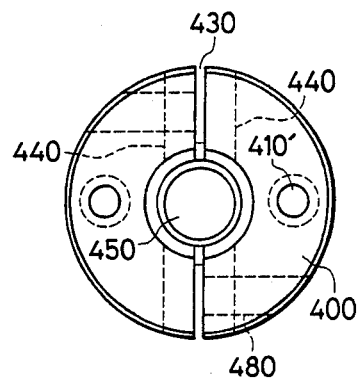

As shown in FIGS. 8A and 8B, the output shaft 400 has the central hole 450 formed at an upper end of the shaft 400. Shaft holes 410' ae formed on the opposite sides of the central hole 450. The output shaft 400 further includes expansion slots 430, notched portions 440, and screw holes 480.

Planet gears 600B are supported by shafts 410 of the output shaft 400 through needle bearings 420 in the respective notched portions 440, and the shafts 410 are fitted in the shaft holes 410'.

The pinion 370 of the intermediate shaft 300 is fittingly inserted in the central hole 450 of the output shaft 400, and each of the planet gears 600B is geared with the corresponding internal gear 500B as well as the pinon 370.

Adjustment screws (not shown but similar to the above-mentioned adjustment screws 360) are screwed in the screw holes 480 respectively so as to be movable in the advancing and retreating directions.

Although not shown in the drawing, through holes (similar to the above-mentioned through holes 160) are formed in the housing 100C so that they can be made to communicate with the respective screw holes 480.

An expansion preventing ring 800 is fitted on the upper outer circumference of the output shaft 400 and is prevented from coming off by means of a washer.

Bearing stoppers 700A and 700B are fixed respectively on the front and rear housings 100A and 100C at their respective outer sides by means of retaining screws 710 being two in number for each bearing stopper. A bearing stopper plate 140 is fixed on the intermediate housing 100B by means of four retaining screws 150.

A spring 910 is provided for applying an axial preload to the bearing 900.

The operation will be described hereinafter.

When the output shaft 200 is rotated, the pinion 210 rotates integrally with the shaft 200 and the pair of planet gears 600A rotate while revolving between the pinion 210 and the internal gear 500A.

The revolution of the planet gears provides reduced rotation of the intermediate shaft 300 through the shafts 310.

The rotation of the intermediate shaft 300 causes its pinion 370 to rotate integrally with the shaft 300 so that the pair of planet gears 600B rotate while revolving between the pinion 370 and the internal gear 500B.

The revolution of the planet gears provides reduced rotation of the output shaft 400 through the planet gear shafts 410. That is, the rotation of the input shaft 200 is transmitted to the intermediate shaft 300 so as to rotate the intermediate shaft 300 at a reduced speed and the rotation of the intermediate shaft 300 is transmitted to the output shaft 400 so as to rotate the shaft 400 at a further reduced speed. That is, a two-speed reduction structure is formed so that high reduction can be performed.

The two-speed reduction is realized through gearing of gears, and therefore play due to back-lash is generated under a non-adjusted condition.

For this, the input shaft 200 is rotated so as to make the through holes 160 of the housing 100B communicate with the screw holes 360'. Thereby, it is possible to insert a driver into the respective through holes 160 so as to make one and the other adjustment screws 360 advance or retreat. As a result, the forward end of the one screw 360 abuts on the opposite end portion of the corresponding expanding slot 330 to made wider the expanding slot 330 and make narrower the other expanding slot 330. Therefore, the respective shafts 310 of the planet gears 600A are slightly displaced in the circumferential direction concentrically with the pinion 210 so as to make the pair of planet gears 600A approach one side or the other by a slight amount.

Owing to the approach described above, the backlash of the gears is eliminated so that the play in gearing is made to disappear at the approached side.

If the two adjustment screws 360 are fastened, no looseness occurs in use.

The reason why the circular slot portions 330' are made axially deep is that the shafts 310 can be circumferentially displaced with no variation in attitude thereof.

Similarly to the adjustment described above, the input shaft 200 or the output shaft 400 is rotated so as to make the through holes of the housing 100C communicate with the screw holes 480 (in which the adjustment screws are screwed). It is thereby possible to insert a driver into the respective through holes so as to make the adjust screws advance and retreat respectively, so that the widths of the expanding slots 430 are made wider and narrower respectively, while the shaft 400 is prevented from expanding by the ring 800. As a result, the respective shafts 410 of the planet gears 600B are slightly displaced in the circumferential direction concentrically with the pinion 370 so as to make the pair of planet gears 600B approach a one-side by a slight amount.

Owing to the approach described above, the backlash of the gears is eliminated so that the play in gearing is made to disappear at the approached side.

The reason why the expansion ring 800 is fitted on the output shaft 400 is in order to prevent the upper end of the output shaft 400 from expanding in adjustment operation by the screws while allowing the shafts 410 to be circumferentially displaced with no variation in attitude thereof.

Modifications

Although being set to 1:25 in the embodiment descried above, the reduction ratio may be set within a range of from 1:20 to 1:50 by properly selecting the tooth-number ratio of the gears.

The embodiment described above is advantageous in balance because the pair of planet gears are provided bisymmetrically. However, the planet gears are not limited to two in number but may be selected to be in any number so long as they are plural, and the positions of the gears are not limited to be symmetrical with each other but may be asymmetrical.

The adjustment may be carried out even in the case where only a single adjust screw and only a single screw hole are provided.

In the embodiment, the means for adjusting the inter-axes interval of the planet gears is arranged such that the respective adjustment screw is made to advance or retreat from one side of the corresponding expanding slot. However, alternatively, means for circumferentially displacing the respective shafts of the planet gears by inserting wedges or screws having tapered ends into the respective expanding slots from the outside of the slots may be used as the inter-axes interval adjusting means.

The intermediate shaft may be made to have the same shape as the output shaft by omitting the pinion and the other parts following the pinion of the intermediate shaft.

Further, similarly to the first embodiment described above, if the input and output shafts are interchanged with each other, the structure may be used as a speed up gear.

Acording to the present invention, it is possible to obtain a reduction gear in which a one-stage of planetary gear mechanism is used to provide a reduction ratio within a range of from 1:3 to 1:15 with no play in gearing due to back-lash. It is also possible to obtain such a high speed reduction ratio that is within a range of from 1:20 to 1:50 by using two-stages of planetary gear mechanisms with a small-sized structure, with no play due to back-lash, and with very little wear due to time aging by the use of rolling rotation.

Since it is possible to set the reduction ratio to be within a range of from 1:3 to 1:9 for one stage, the reduction ratio can be suitably set by a combination of two stages.

The adjustment can be easily carried out by using the adjustment screws.

What is claimed is:

1. A speed-change gear, comprising:
   a housing;
   a first annular internal gear fixed in said housing;
   a first pinion disposed in said housing concentrically with said first internal gear;
   a first shaft provided integrally with said first pinion and rotatably supported in said housing;
   a plurality of first planet gears geared with said first pinion and said first internal gear;
   a second shaft rotatably supported in said housing, said planet gears being supported by said second shaft with at least one circumferential inter-axes interval therebetween, said second shaft having at least two support portions respectively supporting said first planet gears and being circumferentially movable with respect to each other; and
   first means for changing a size of said inter-axes interval of said first planet gears by circumferentially moving said support portions with respect to each other, wherein said first changing means includes a screw threaded in one of said support portions and having an axial end contactable with another of said support portions.

2. A speed-change gear, comprising:
   a housing;
   a first annular internal gear fixed in said housing;
   a first pinion disposed in said housing concentrically with said first internal gear;
   a first shaft provided integrally with said first pinion and rotatably supported in said housing;
   a plurality of first planet gears geared with said first pinion and said first internal gear;
   a second shaft rotatably supported in said housing, said planet gears being supported by said second shaft with at least one circumferential inter-axes interval therebetween, wherein said second shaft has at least two support portions respectively supporting said first planet gears wherein said support portions are integral with each other and bendable in a circumferential direction with respect to each other; and
   first means for changing a size of said inter-axes interval of said first planet gears by circumferentially moving and thereby bending said support portions with respect to each other.

3. A speed-change gear as recited in claim 2, wherein said changing means includes a screw threaded in one of said support portions and having an axial end contactable with another of said support portions.

4. A speed-change gear as recited in claim 1, further comprising:
   a second annular internal gear fixed to said housing:
   a second pinion fixed to said second shaft concentrically with said second internal gear;
   a plurality of second planet gears mounted on respective second planet gear shafts and geared with said second pinion and said second internal gear;
   a third shaft rotatably supported in said housing and supporting said second planet gear shafts with at least one circumferential inter-axes interval therebetween; and
   second means for changing a size of said inter-axes interval of said second planet gear shafts.

5. A speed-change gear as recited in claim 4, further comprising a bearing between an outer circumference of said second shaft and an inner circumference of said third shaft.

6. A speed-change gear as recited in claim 1, wherein said first planet gears are diametrically arranged.

7. A speed-change gear, comprising;
   a housing;
   a first annular internal gear fixed in said housing;
   a first pinion disposed in said housing concentrically with said first internal gear;
   a first shaft provided integrally with said first pinion and rotatably supported in said housing;
   a plurality of first planet gears mounted on respective first planet gear shafts and geared with said first pinion and said first internal gear;
   a second shaft rotatably supported in said housing, said first planet gear shafts being supported by said second shaft with at least one inter-axes interval therebetween along a circumferential direction of said first pinion, wherein said second shaft has at least two support portions respectively supporting said first planet gear shafts and being circumferentially movable with respect to each other; and
   first means for changing and stationarily fixing a size of said inter-axes interval of said first planet gear shafts;
   wherein said second shaft has at least two support portions, respectively supporting said first planet gear shafts and being circumferentially movable with respect to each other; and
   wherein said first changing means includes means for circumferentially moving said support portions with respect to each other and includes a screw threaded in one of said support portions and having an axial end contactable with another of said support portions.

8. A speed-change gear, comprising;
   a housing;
   a first annular internal gear fixed in said housing;
   a first pinion disposed in said housing concentrically with said first internal gear;
   a first shaft provided integrally with said first pinion and rotatably supported in said housing;
   a plurality of first planet gears mounted on respective first planet gear shafts and geared with said first pinion and said first internal gear;
   a second shaft rotatably supported in said housing, said first planet gear shafts being supported by said second shaft with at least one inter-axes interval therebetween along a circumferential direction of said first pinion, wherein said second shaft has at least two support portions respectively supporting said first planet gear shafts and being circumferentially movable with respect to each other and wherein said support portions are integral with each other and bendable in a circumferential direction with respect to each other; and first means for changing and stationarily fixing a size of said inter-axes interval of said first planet gear shafts.

9. A speed-change gear as recited in claim 8, wherein said changing means includes a screw threaded in one of said support portions and having an axial end contactable with another of said support portions.

* * * * *